United States Patent
Lim et al.

(10) Patent No.: US 9,517,951 B2
(45) Date of Patent: Dec. 13, 2016

(54) APPARATUS AND METHOD FOR THE SEAWATER PRE-TREATMENT FOR DESALINATING SEAWATER INTO FRESH WATER

(71) Applicants: Un Young Lim, Daejeon (KR); Jeong Seo Lim, Daejeon (KR)

(72) Inventors: Un Young Lim, Daejeon (KR); Jeong Seo Lim, Daejeon (KR)

( * ) Notice: Subject to any disclaimer, the term of this patent is extended or adjusted under 35 U.S.C. 154(b) by 0 days.

(21) Appl. No.: 14/820,052

(22) Filed: Aug. 6, 2015

(65) Prior Publication Data
US 2016/0068412 A1    Mar. 10, 2016

(30) Foreign Application Priority Data
Sep. 5, 2014    (KR) .................. 10-2014-0118631

(51) Int. Cl.
| | | |
|---|---|---|
| *B01D 29/00* | (2006.01) | |
| *B01D 63/06* | (2006.01) | |
| *C02F 1/44* | (2006.01) | |
| *B01D 61/08* | (2006.01) | |
| *C02F 103/08* | (2006.01) | |
| *C02F 1/00* | (2006.01) | |

(52) U.S. Cl.
CPC .............. *C02F 1/441* (2013.01); *B01D 61/08* (2013.01); *B01D 63/06* (2013.01); *C02F 1/001* (2013.01); *C02F 2103/08* (2013.01)

(58) Field of Classification Search
None
See application file for complete search history.

(56) References Cited

U.S. PATENT DOCUMENTS

| | | | | |
|---|---|---|---|---|
| 3,256,996 A | * | 6/1966 | Paine ................ | B01D 29/00 210/457 |
| 3,456,802 A | * | 7/1969 | Cole ................. | B01D 61/04 203/DIG. 17 |
| 3,670,898 A | * | 6/1972 | Fournier ............ | B01D 29/15 210/356 |

(Continued)

FOREIGN PATENT DOCUMENTS

| | | |
|---|---|---|
| KR | 10-0672844 B1 | 1/2007 |
| KR | 10-0740302 B1 | 7/2007 |

(Continued)

*Primary Examiner* — Krishnan S Menon
(74) *Attorney, Agent, or Firm* — KORUS Patent, LLC; Seong Il Jeong

(57) ABSTRACT

Disclosed are an apparatus and method for the seawater pre-treatment to remove salt from seawater. The seawater pre-treatment apparatus for desalinating seawater into fresh water comprises: a seawater pre-treatment unit, located at a predetermined depth of a sea floor, for obtaining a pre-treated water by removing impurities from the seawater; a pre-treatment water tank, located on the ground, for accommodating the pre-treatment water tank produced by the pre-treatment unit; and a connection flow channel for connecting the pre-treatment unit and the pre-treatment water tank such that the pre-treated water can be transported. The seawater pre-treatment apparatus and method are capable of simplifying the configuration of the entire apparatus while reducing the consumption of energy during the pre-treatment process for the seawater desalination.

4 Claims, 4 Drawing Sheets

(56) References Cited

U.S. PATENT DOCUMENTS

| | | | | |
|---|---|---|---|---|
| 3,776,842 A * | 12/1973 | Grimme | ............... | B01D 61/022 |
| | | | | 210/259 |
| 8,382,981 B2 * | 2/2013 | Rogers | ................... | B01D 61/18 |
| | | | | 210/232 |
| 2005/0139531 A1 * | 6/2005 | Gordon | ................... | B01D 29/15 |
| | | | | 210/108 |
| 2006/0070940 A1 * | 4/2006 | Colby | .................... | B01D 63/10 |
| | | | | 210/321.74 |
| 2010/0290032 A1 * | 11/2010 | Bugge | ..................... | B07C 5/342 |
| | | | | 356/51 |
| 2013/0142677 A1 * | 6/2013 | Snyder | ................... | B01D 61/10 |
| | | | | 417/357 |
| 2014/0197091 A1 * | 7/2014 | Andersen | ............. | B01D 35/303 |
| | | | | 210/323.2 |

FOREIGN PATENT DOCUMENTS

| | | |
|---|---|---|
| KR | 10-1115132 B1 | 3/2012 |
| KR | 10-1126049 B1 | 3/2012 |
| KR | 10-1538477 B1 | 7/2015 |

\* cited by examiner

US 9,517,951 B2

APPARATUS AND METHOD FOR THE SEAWATER PRE-TREATMENT FOR DESALINATING SEAWATER INTO FRESH WATER

CROSS-REFERENCE TO RELATED APPLICATION(S)

This application claims the benefit of Korean Patent Application No. 10-2014-0118631, filed on Sep. 5, 2014, which is hereby incorporated by reference herein in its entirety.

BACKGROUND

1. Technical Field

The present invention relates generally to an apparatus and a method for the seawater pre-treatment for desalinating seawater into fresh water.

2. Description of the Related Art

In general, seawater desalination refers to obtaining fresh water by removing various impurities and salts from seawater, which contains salts. Generally, seawater desalination methods include an evaporation method, a reverse osmosis and a freezing method.

The evaporation method is a method for obtaining fresh water by a low-pressure evaporation system which performs evaporation by lowering pressure after supplying heat to seawater.

The reverse osmosis method is a method for extracting fresh water by filtering the ionic materials dissolved in seawater through a semipermeable membrane designed such that the ionic substances dissolved in water are substantially excluded from filtering and only pure water passes through. This reverse osmosis method has the advantage that consumption of energy is low and its operation is easy, as compared with the evaporation method, and so it has been widely used recently. In order to separate pure water and ionic materials from seawater, a pressure higher than that of the osmotic pressure is required. Reverse osmosis refers to this pressure. In the case of seawater desalination, it generally requires a high pressure of about 42 to 70 bar.

The seawater desalination facilities required by the reverse osmosis method may include a pre-treatment apparatus, a seawater desalination apparatus and an after-treatment apparatus in order to remove foreign materials and salts contained in seawater.

Among them, the pre-treatment device is intended to improve the desalination efficiency by removing in advance a foreign material contained in seawater before removing salt from seawater. In the case of not conducting the pre-treatment stage, there are problems in that a higher reverse osmosis pressure is required when removing salts from seawater by the reverse osmosis method and also foreign materials excessively adhere to the membrane, thus reducing the permeation of fresh water through the membrane.

In the conventional pre-treatment stage for desalination, seawater that is stored in a fixed volume in a storage tank is transferred to a sand filter or a multi-layer filter via a transfer pump to remove the primary impurities and, if necessary, organic impurities are removed by passing through the activated carbon filter.

The pre-treated water that has passed through the pre-treatment procedure is introduced into a reverse osmosis filtration device for desalination and separated into desalinated water and concentrated water. The concentrated water is discharged, and the desalinated water is mineralized and sterilized in the after-treatment stage and placed into a final storage tank.

Conventional pre-treatment facilities for seawater desalination have disadvantages in several aspects. For example, a high transfer pressure is required to remove foreign materials from seawater, the consumption of energy is high and several filtering steps need to be performed. Therefore, the devices are large in size and complicated.

PRIOR ART DOCUMENT

[Patent Document] Korean Patent No. 10-2005-0672844

SUMMARY

The present invention has been made keeping in mind the above problems encountered in the prior arts, and an object of the present invention is to provide an apparatus for the seawater pre-treatment for desalinating seawater into fresh water, which is capable of simplifying the configuration of the entire apparatus, while reducing the consumption of energy during the pre-treatment process for the seawater desalination.

In order to accomplish the above objects, an embodiment of the present invention provides a seawater pre-treatment apparatus for desalinating seawater into fresh water which comprises:

seawater pre-treatment unit, located at a predetermined depth of a sea floor, for obtaining a pre-treated water by removing impurities from the seawater;

a pre-treatment water tank, located on land, for accommodating the pre-treated water produced by the pre-treatment unit; and a connection flow channel for connecting the pre-treatment unit and the pre-treatment water tank such that the pre-treated water can be transported, wherein the pre-treatment unit comprises:

a plurality of water collection pipes which are supported by a support part and have a plurality of openings formed in the side;

a plurality of filtration filters in the form of a ring which is inserted into the outside of each of the water collection pipes;

a water collection tank which is in fluid communication with the water collection pipe and which accommodates the pre-treated water that has passed through the filtration filter and the water collection pipe; and a water conveying pump for sucking the pre-treated water from the inner part of the water collection tank and transferring the pre-treated water collected within the water collection tank through a connection flow channel, wherein the one end of the water collection pipe is closed and the other end is in fluid communication with the water collection tank, and the seawater passes through the filtration filter by a reverse osmosis method by the difference in pressure between the inside and outside of the filtration filter and then is collected by the water collection tank via the water collection pipe.

In another embodiment, the seawater pre-treatment apparatus of the present invention further comprises a weight body which is connected to the water collection tank to prevent movement of the pre-treatment unit on the sea floor.

In another embodiment, the respective water collection pipes are spaced apart in a state of being erected in a longitudinal direction, the support part comprises an upper support part for supporting the upper end of the water collection pipe and a lower support part for supporting the lower end of the water collection pipe, and the lower support part is in fluid communication with the water collection tank.

In another embodiment, the seawater pre-treatment apparatus of the present invention further comprises a plurality of connecting rings which are inserted into the outside of the respective water collection pipe, the adjacent filtration filters being connected with each other via the connecting rings in the state in which the filtration filter is inserted into the outside of the water collection pipe.

In another embodiment, the seawater pre-treatment apparatus of the present invention further comprises a strainer in the form of a ring which is inserted into the outside of the respective filtration filters; a connecting plate which connects a plurality of the strainers with each other; and a water pump which is installed in the connecting plate to raise or lower the entire connection plate by the driving force by jetting seawater, wherein impurities attached to the surface of the filtration filter can be removed by raising or lowering the strainer along the filtration filter.

In order to accomplish the above-mentioned objects, one embodiment of the present invention provides seawater pre-treatment method for desalinating seawater into frech water which comprises: installing a filtration filter in the form of a ring at a predetermined depth of a sea floor, installing a water collection pipe in which a plurality of openings are formed in the inside of the filtration filter, the water collection pipe being in fluid communication with the water collection tank; sucking pre-treated water from the inner part of the water collection tank by the water conveying pump, and passing the seawater through the filtration filter by a reverse osmosis method and putting into the water collection pipe and the water collection tank.

Further, the seawater pre-treatment method of the present invention further comprises removing impurities attached to the filtration filter by raising or lowering the strainer put into the outside of the filtration filter.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
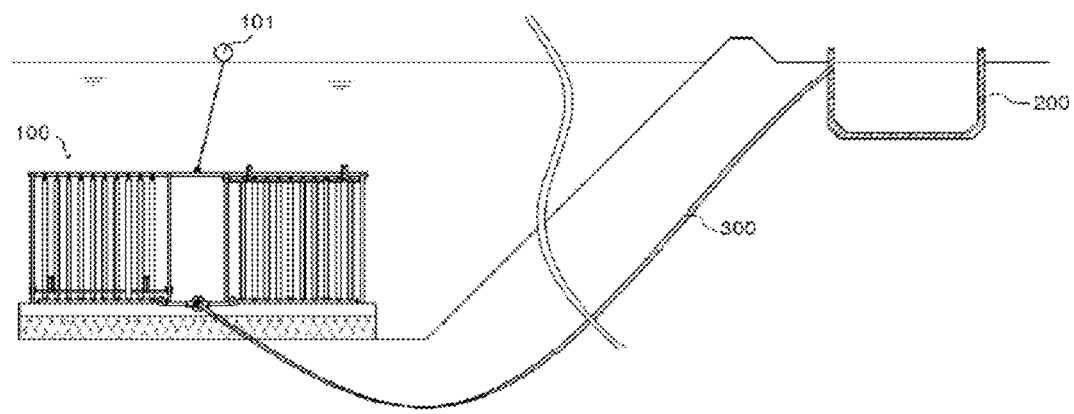
FIG. 1 is a view showing the seawater pre-treatment apparatus according to an embodiment of the present invention.

Hereinafter, the configuration and operation of preferred embodiments of the present invention will be described in detail with reference to the accompanying drawings. Here, in the case of assigning the reference numerals to the components of the drawings, it should be noted that, with respect to the same components, the same reference numerals are used even in different drawings.

Seawater desalination refers to obtaining fresh water by removing various impurities and salts from seawater which contains salts. The seawater pre-treatment apparatus and seawater pre-treatment method according to the present invention is primarily used for the pre-treatment stage in reverse osmotic membrane method.

The seawater desalination facilities used by the reverse osmotic membrane method frequently conduct the pre-treatment step for removing in advance the impurities contained in seawater before removing the salts contained in the seawater. In the case of not undergoing the pre-treatment stage, there are problems in that a higher reverse osmosis pressure is required when removing salt from seawater by the reverse osmosis method and also foreign materials excessively adhere to the membrane, thus reducing the permeation of fresh water through the membrane.

Figure 2:
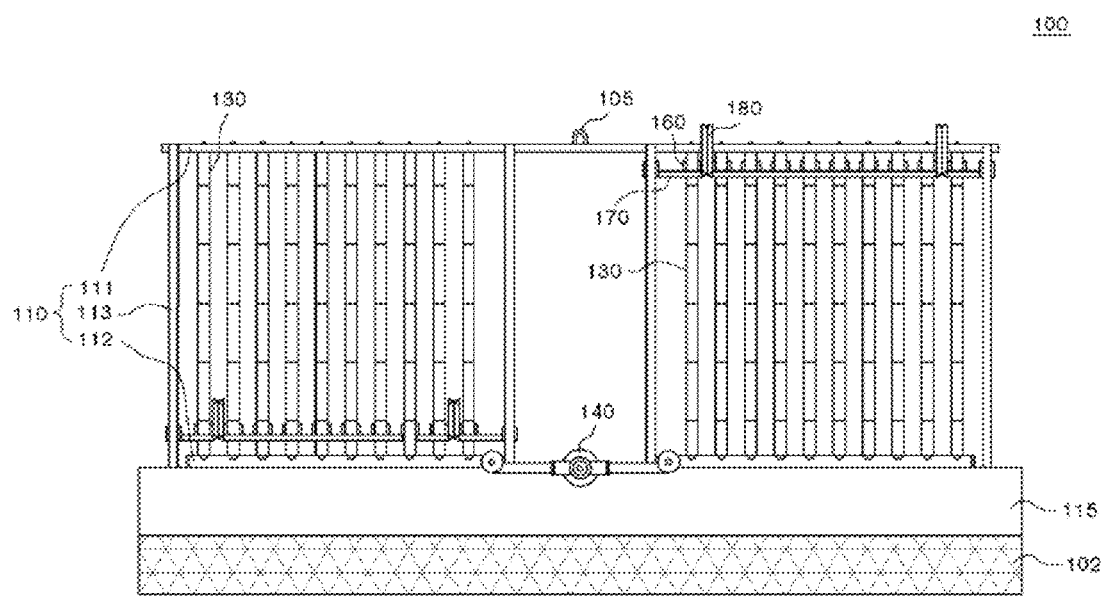
FIG. 2 is a side view illustrating in detail the pre-treatment unit in the seawater pre-treatment apparatus of FIG. 1.
Figure 3:
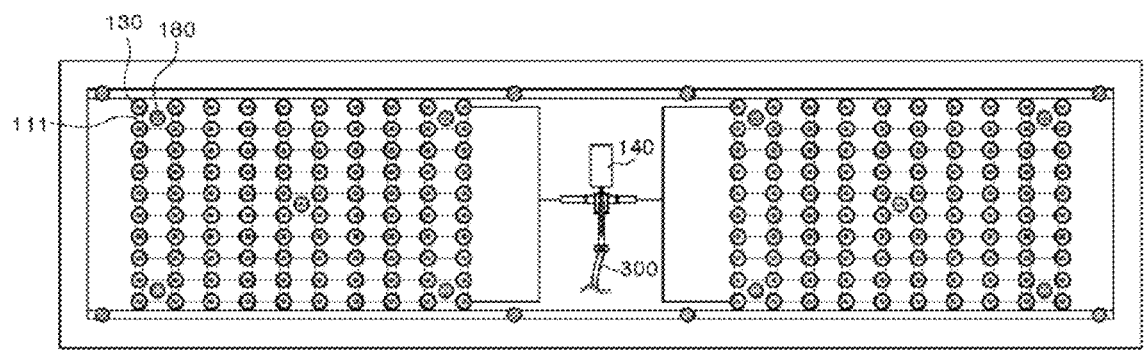
FIG. 3 is a schematic plan view of the pre-treatment unit of FIG. 2.
Figure 4:
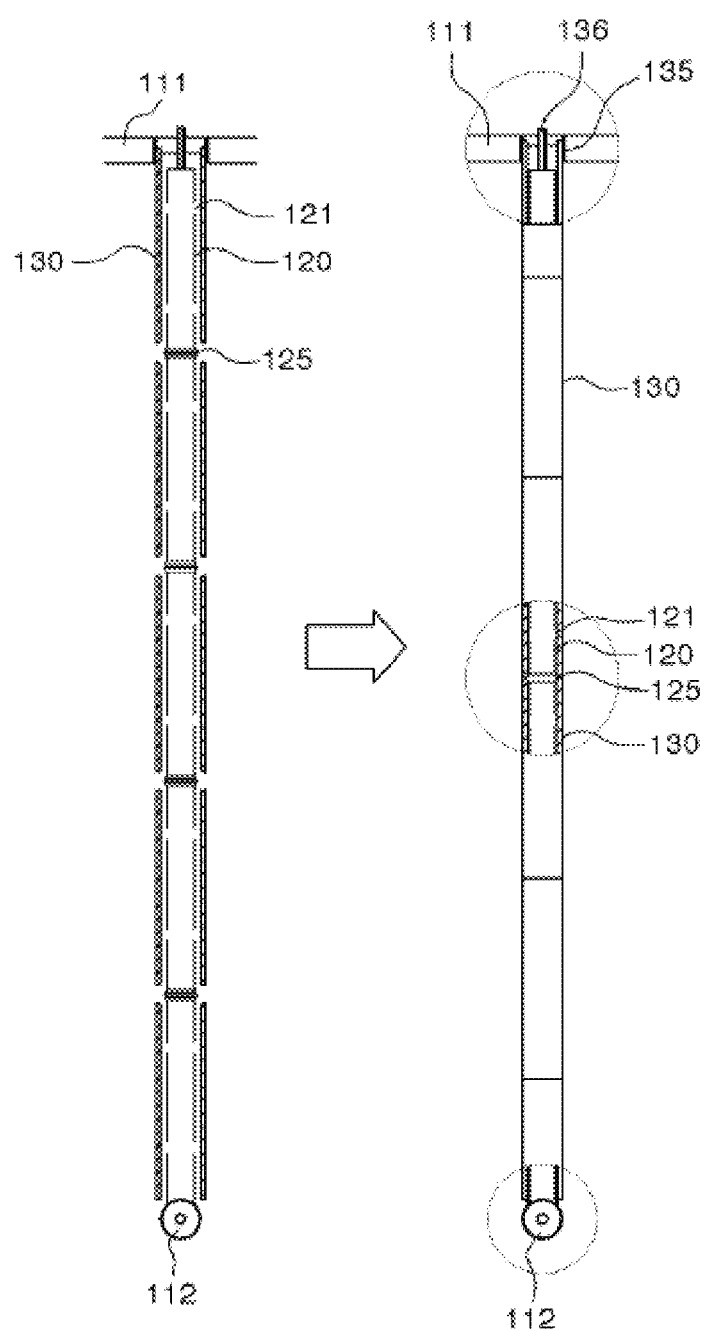
FIG. 4 is a diagram showing in detail part of the structure of the pre-treatment unit of FIG. 2.
Figure 5:
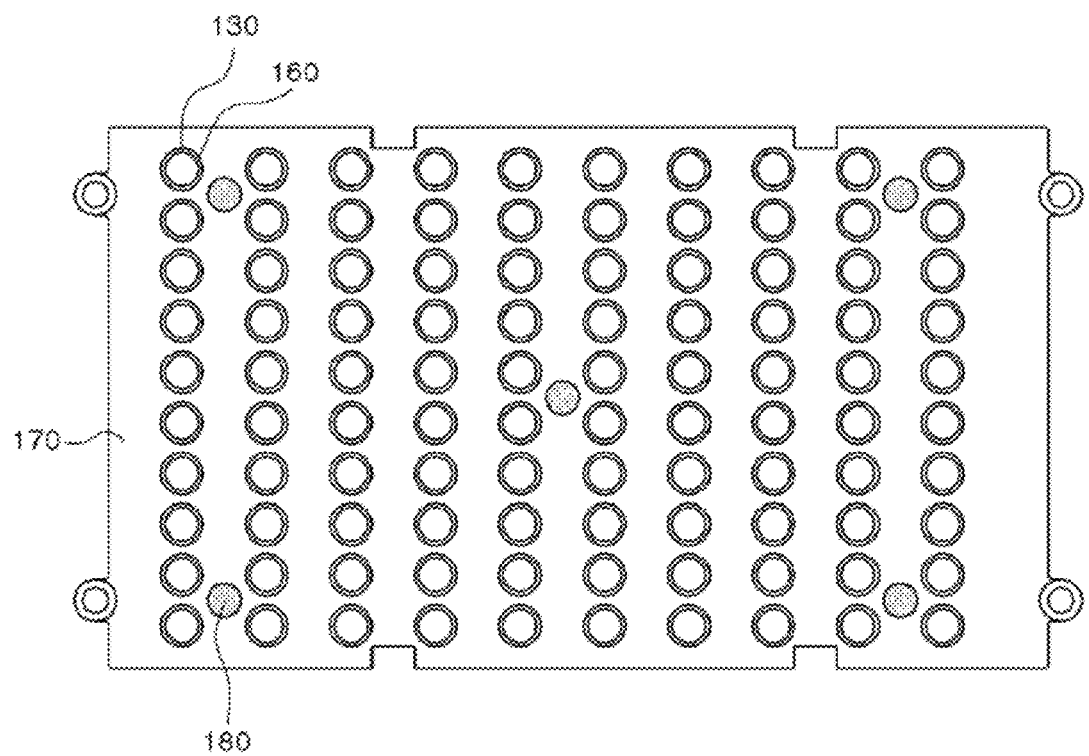
FIG. 5 is schematic plan view for illustrating the structure of the strainer in the pre-treatment unit of FIG. 2.
Figure 6:
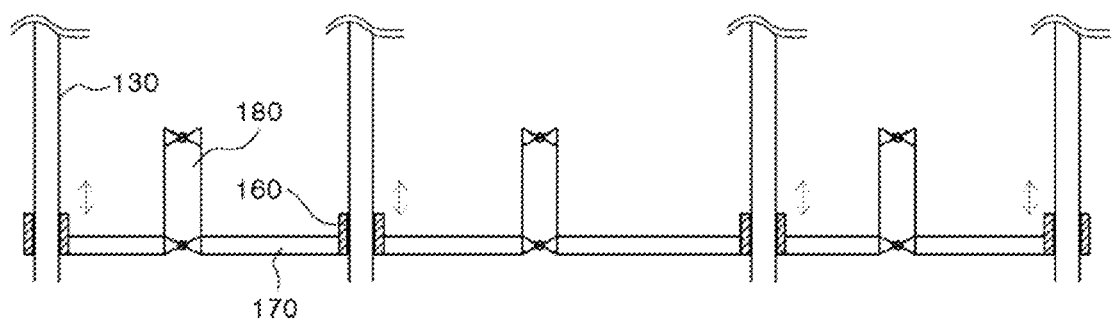
FIG. 6 is a schematic side view for illustrating the structure of the strainer in the pre-treatment unit of FIG. 2

FIG. 1 is a view showing the seawater pre-treatment apparatus according to an embodiment of the present invention. FIG. 2 side view illustrating in detail the pre-treatment unit in the seawater pre-treatment. apparatus of FIG. 1. FIG. 3 is a schematic an view of the pre-treatment unit of FIG. 2. FIG. 4 is a diagram showing in detail part of the structure of the pre-treatment unit of FIG. 2. FIG. 5 is a schematic plan view for illustrating the structure of the strainer pre-treatment unit of FIG. 2. FIG. 6 is a schematic side view forillustrating the structure of the strainer in the pre-treatment unit of FIG. 2.

The seawater pre-treatment apparatus of the present invention comprises a pre-treatment unit 100, a pre-treatment water tank 200 and a connection flow channel 300.

The pre-treatment unit 100 may be located at a predetermined depth of the sea floor, for example, at the depth of 50 to 100 m of the sea floor. The pre-treatment unit 100 is for the purpose of obtaining a pre-treated water from the seawater by a reverse osmosis method by the natural pressure of the seawater. Here, the pre-treated water refers to that in which colloidal materials, organic materials, inorganic materials, microorganisms and the like are large removed from the seawater, and refers to state in which salts remains in seawater. The pre-treatment unit 100 can be connected to a buoy 101 so as to display its position on the sea.

The pre-treatment unit 100 is preferably installed in an open area in which the movement of the ocean currents due to the tide does not go and return in the same interval. Also, the pre-treatment unit 100 is preferably installed on a flat portion of the sea floor.

The pre-treatment water tank 200 is located on land and accommodates the pre-treated water produced by the pre-treatment unit 100.

The connection flow channel 300 is connected to the pre-treatment unit 100 and the pre-treatment water tank 200 and enables the pre-treated water produced by the pre-treatment unit 100 to transfer to the pre-treatment water tank 200.

The pre-treatment unit 100 comprises a concrete 102, a supporting part 110, a water collection tank 115, a water collection pipe 120, a filtration filter 130, a water conveying pump 140, strainer 160, a connection plate 170, and a water pump 180 and he like.

The pre-treatment unit 100 is composed of one module, and a ring 105 can be formed on the upper end of the pre-treatment unit 100. It is possible to lift up the pre-treatment unit (100) over the sea by hooking to the ring 105 and pulling it. When the pre-treatment unit 100 is installed in the sea floor, the concrete 102 is first installed and then the remaining structure comprising the water collection tank 115 on the concrete 102 can be installed. Thus, when repairing the pre-treatment unit 100, the concrete 102 is placed as it stands, the remaining structure comprising the water collection tank 115 is separated from the concrete 102, pulled above the sea and then repaired. At this time, the connection flow channel 300 must also be separated.

Concrete 102 (or weight body) is arranged in the lower part of the pre-treatment unit 100 and enable the pre-treatment unit 100 to not be moved by ocean currents. The concrete 102 can be connected with the water collection tank 115 to be fixed to the bottom of the sea floor. The concrete 102 can be substituted with another weight body.

Referring to FIGS. 2 and 4, the water collection pipe 120 has a hollow cylindrical shape and is supported by the support part 110. A plurality of openings 121 is formed on the side surface of the water collection pipe 120.

Each of the water collection pipe 120 can be spaced apart while being erected in a vertical direction. The water collection pipe 120 is in fluid communication with the water collection tank 115 and enable the pre-treatment water which has passed through the filtration filter 130 to be collected in the water collection tank 115.

The support part 110 may comprise an upper support part 112 for supporting the lower end of the plurality of the water collection pipes 120, a lower support part 112 for supporting the lower part of the plurality of the water collection pipes 120, and an intermediate support part 113 for connecting the upper support part 111 and the lower support part 113.

The upper support part 111 can be installed with a cap (135) having a function of the valve 136 for opening and closing the inner part of the water collection pipe 120, thus sealing the upper end of each of the water collection pipe 120 from such cap (135). The lower support part 112 is in the form of a flow channel and can be in fluid communication with the plurality of the water collection pipe 120 and the water collection tank 115.

The filtration filter 130 is in the form of a ring and can be located on the outside of the water collection pipe 120. The filtration filter 130 can remove impurities from seawater by being configured such that the impurities contained in the sea water do not pass through the filtration filter 130 when the sea water passes through the filtration filter 130 by a reverse osmosis method. In the filtration filter 130, the lattice has a size such that it does not allow impurities contained in the sea water to pass through, but allows salt to pass through. Such impurities may be colloidal materials, organic materials, inorganic materials and microorganisms contained in the seawater. The lattice size of the filtration filter 130 may be selected within a suitable range depending on the desired filtering degree, the state of sea water and the kc by a person skilled in the art.

In the embodiment of the present invention, the plurality of the filtration filters 130 can be inserted into the outside of one water collection pipe 120. For example, the filtration filter 130 has a length of 2 m and the water collection pipe 120 may have a length of 10 m. At this time, the adjacent filtration filters 130 can be connected to each other by a connecting ring which is inserted into the outside of the water collection pipe 120.

In FIG. 4, the left side of the Figure shows a state in which the filtration filter 130 and the connecting ring 124 are decomposed, and the right side of the figure shows the assembled state. While the connecting ring 125 assembled with the filtration filter 130, the adjacent tration filters 130 can be continuous to each other while maintaining the same height. Moreover, the upper part of the filtration filter 130 located at the highest position can be supported on the upper support 111 in a water tight or airtight manner. In addon, the lower part of the filtration filter 130 located at the lowest position can be suported on the lower support part 112 or the water collection pipe 120 in a watertight or airtight manner. While the filtration filter 130 is assembled with the connecting ring 125, it must be a watertight structure between the filtration filter 130 and the connecting ring 125.

While the filtration filter 130 is assembled with the water collection pipe 120, there is a slight gap between the respective filtration filter 130 and the water collection pipe 120. Therefore, the seawater in the outside of the filtration filter 130 can pass through the filtration filter 130 by a reverse osmosis method and then flow in the inner part of the water collection. pipe 120 through the opening 121. The seawater that has passed through the filtration filter 130 becomes a pre-treated water in the state wherein the impurities are removed and the salt remains.

The water collection tank 115 is in fluid communication with the respective water collection pipe 120, and the pre-treated water that has passed. through the water collection pipe 120 can be accommodated in the water collection tank 115.

The water conveying pump 140 serves to suck the pre-treated water from the inner part of the water collection tank 115 and to transfer for the pre-treated water collected in the water collection tank 115 to the pre-treatment water tank 200 via the connection flow channel 300. For example, the water conveying pump is placed in the center and a pre-treatment module with the same size can be displaced on either side.

When sucking the pre-treated water from the inside of the water collection tank 115 by a water conveying pump 140, the inside of the water collection tank 115 and the water collecting pipe 120 may be made to have a negative pressure. In this case, the seawater passes through the filtration filter 130 by the reverse osmosis method by the difference of the internal and. external pressures of the filtration filter 130 and then it can be collected in the water collection tank 115 via the water collection pipe 120.

The water conveying pump 140 is periodically reversely rotated, and the foreign materials attached to the surface of the filtration filter 130 can be removed by being discharged into seawater by a forward osmotic pressure rather than reverse osmosis, the foreign materials attached to the surface of the filtration filter 130 by the forward osmotic pressure can be removed by being released into seawater. When the water pump 140 is reversely rotated, the pre-treated water is discharged into seawater reversely via a filtration filter 130. Therefore, the tip of the connecting flow channel 300 must be submerged and the pre-treatment water tank 200 to prevent the inflow of air.

Referring to FIGS. 3, 5 and 6, a strainer 160 is provided to remove the impurities attached to the filtration filter 130. While seawater is passed through the filtration filter 130 by a reverse osmosis, the gradually growing amount of impurities is attached to the filtration filter 130. These impurities blocks the lattice of the filtration filter 130 to make the passage of the seawater difficult. Therefore, means for removing impurities attached to the filtration filter 130 is required.

The strainer 160 is in the form of a short ring and can be inserted into the outside of the filtration. filter 130. A strainer 160 is inserted into the respective filtration filter 130 one-by-one. Each of the strainer 160 can be connected to each other by a connecting plate 170. Therefore, when raising or lowering the connecting plate 170, each of the strainer 160 can also be raised or lowered. along the surface of the filtration. filter 130, thereby removing impurities attached to the surface of the filtration filter 130.

The connecting plate 170 is installed with the water pump 180, and a driving force capable of raising or lowering the entire connecting plate 170 is generated by jetting the seawater up or down by the water pump 180.

For example, dozens of the strainers 160 are connected to one connecting plate 170. In one of the connecting plates 170, the water pump 180 can be displaced in the center and four corners. These water pumps 180 can jet the seawater downwardly by a forward rotation, thus raising the entire connecting plate 170. The motor of the water pump 180 can jet the seawater upwardly by the reverse rotation, thus lowering the entire connecting plate 170.

Hereinafter, referring to FIGS. 1 to 6, the seawater pre-treatment method. for desalinating the seawater into fresh water according to the present invention will be described.

First, a plurality of filtration filters 130 in the form of a ring spaced apart is installed at a predetermined depth of the sea floor, for example, at regular intervals of 50~100 m, and the water collection pipe is installed in the inner part of such respective filtration filter 130. A slight gap exists between the filtration filter 130 and the water collection pipe 120. An opening 121 corresponding to the filtration filter 130 is formed in the water collection pipe 120 such that the pre-treated water that has passed the filtration filter 130 can enter into the water collection pipe 120. The water collection pipe 120 is in fluid communication with the water collection tank 115. In this case, the filtration filter 130 is subjected. to a natural hydraulic pressure of about 6-11 atm, by the sea water. The seawater can enter into the water collection pipe 120 only through the filtration filter 130, and it cannot enter into the water collection pipe 120 through any other path.

Next, when sucking the pre-treated water from the inside of the water collection tank (115) by a water pump (140), the inside of the water collection pipe 120 connected with the water collection tank. 115 is made to have a negative pressure. The seawater can be passed through the filtration filter 130 by the reverse osmosis method by the pressure difference between the inside and outside of the filtration filter 130. The seawater can enter into the water collection tank 115 via the water collection pipe 120 through a filtration filter 130.

While seawater passes through the filtration filter 130, impurities contained in seawater, for example, colloidal materials, organic materials, inorganic materials, microorganisms and the like can be primarily removed from seawater by passing through the filtration filter 130. The pre-treated water in which. impurities are removed by passing through the filtration filter 130 can be collected. in the water collection tank 115. The depth at which the filtration filter 130 is installed in the sea floor can be appropriately set depending on the negative pressure of the water conveying pressure 140 and the type of impurities to be removed.

Next, the water conveying pump 140 Then, water pump (140) is allowed to transfer the pre-treated water that has been entered into the inside of the water collection tank 115 to the pre-treatment water tank 200 on land through. the connection flow channel 300. Thus, in the pre-treatment water tank 200 on land, the desalination process can he performed to secondarily remove salts from the seawater.

Whle the seawater passes through the filtration filter 130, many impurities are attached to the filtration filter 130 and so the filtration efficiency can be decreased. Therefore, a means for cleaning the filtration filter 130 is required. For this purpose, the strainer 160 inserted into the outside of the filtration filter 130 is periodically or continuously raised or lowered by the water pump 180, thus removing the impurities attached to the filtration filter (130).

Further, the water conveying pump 140 is periodically and reversely rotated, and the foreign materials attached to the surface of the filtration filter 130 can be removed by discharging in the seawater by the forward osmosis rather than the reverse osmosis. When the water conveying pump 140 is reversely rotated, the pre-treated water is discharged in the seawater through the filtration filter 130 in reverse. Therefore, the tip of the connecting flow channel 300 must be submerged in the pre-treatment water tank 200 to prevent the inflow of air.

According to the seawater pre-treatment apparatus and. the seawater pre-treatment method of the present invention described above, in the course of the pre-treatment procedure for the seawater desalination, the pre-treatment unit 100 is located at the bottom of the sea and is subjected to a natural hydraulic pressure. Therefore, the seawater passes through the filtration. filter by a. natural hydraulic pressure or the seawater passes through the filtration filter 130 by simply providing a low negative pressure by the water conveying pump 140. The pre-treated water that has passed through the filtration filter 130 like this can be collected in the water collection tank 115. Therefore, it is possible to reduce the consumption of energy for the pre-treatment for removing impurities except the salt in seawater. In addition, impurities having a fine size can be removed at the same time while the seawater passes through the filtration filter (130) by the reverse osmosis. Therefore, it is possible to simplify the configuration. of the seawater pre-treatment apparatus.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:
1. A pre-treatment apparatus comprising:
an underwater seawater pre-treatment assembly configured to obtain a pre-treated water by removing impurities from a seawater;
a pre-treatment water tank, located on land, configured to accommodate the pre-treated water produced by the pre-treatment assembly; and
a connection flow channel configured to connect the pre-treatment assembly and the pre-treatment water tank,
wherein the pre-treatment assembly comprises:
a plurality of water collection pipes which are supported by a support part, each water collection pipe having a plurality of openings formed on a side portion;
a plurality of filtration filters spacedly arranged from each other in a longitudinal direction of each of the plurality of water collection pipes, each filtration filter surrounding a water collection pipe, among the plurality of water collection pipes, the filter being in the form of a hollow cylinder, wherein each filtration filter comprises meshes, a size of the meshes being configured such that the filter does not allow impurities contained in the seawater to pass through, but allows salt to pass through, and each filtration filter has a vertical side portion parallel to a vertical side portion of the water collection pipe, wherein the vertical side portion of the filtration filter directly contacts the seawater to be pre-treated;
a water collection tank which is in fluid communication with the water collection pipe and configured to accom- modate the pre-treated water that has passed through the filtration filter and the water collection pipe;

a water conveying pump configured to suck the pre-treated water from an inner part of the water collection tank and transfer the pre-treated water collected within the water collection tank through a connection flow channel, and a strainer in the form of a ring which is inserted into the outside of the respective filtration filters; a connecting plate which connects a plurality of the strainers with each other; and a water pump which is installed into the connecting plate to raise or lower the entire connection plate by the driving force by jetting seawater, wherein impurities attached to the surface of the filtration filter can be removed by raising or lowering the strainer along the filtration filter, wherein one end of the water collection pipe is closed and the other end of the water collection pipe is in fluid communication with the water collection tank, and the seawater passes through the filtration filter by a difference in pressure between an inside and an outside of the filtration filter and then is collected by the water collection tank via the water collection pipe.

2. The pre-treatment apparatus of claim 1, further comprising a weight body which is connected to the water collection tank to prevent movement of the pre-treatment assembly on a sea floor.

3. The pre-treatment apparatus of claim 2, wherein the respective plurality of water collection pipes are spaced apart in a state of being erected in a longitudinal direction, the support part comprises an upper support part configured to support an upper end of the water collection pipe and a lower support part configured to support a lower end of the water collection pipe, and the lower support part is in fluid communication with the water collection tank.

4. The pre-treatment apparatus of claim 3, further comprising a plurality of connecting rings which are fitted to an external portion of the respective water collection pipe, adjacent filtration filters being connected to each other via the plurality of connecting rings in a state in which the plurality of filtration filters are inserted into the external portion of the water collection pipe.

* * * * *